(No Model.)

M. F. SMITH.
MACHINE GUN.

No. 548,096.

Patented Oct. 15, 1895.

FIG.1

Witnesses:
Jno. C. Ritter
Fred. A. Fleischmann

Inventor:
Morris F. Smith,
by his Attorney,
Horace Pettit (No Model.) 9 Sheets—Sheet 3.

M. F. SMITH.
MACHINE GUN.

No. 548,096. Patented Oct. 15, 1895.

FIG. 3

Witnesses:
Jno E. Parker
F. A. Fleischmann

Inventor:
Morris F. Smith,
by his Attorney, (No Model.)   M. F. SMITH.   9 Sheets—Sheet 6.
MACHINE GUN.

No. 548,096.   Patented Oct. 15, 1895.

FIG. 6.

Witnesses:
Jno. E. Parker
Fred. A. Fleischmann

Inventor:
Morris F. Smith,
by his Attorney,
Jones Pettit (No Model.) 9 Sheets—Sheet 7.

M. F. SMITH.
MACHINE GUN.

No. 548,096. Patented Oct. 15, 1895.

Witnesses:
Jno E Parker
Fred A Fleischmann

Inventor:
Morris F. Smith,
by his Attorney, (No Model.) 9 Sheets—Sheet 8.
M. F. SMITH.
MACHINE GUN.

No. 548,096. Patented Oct. 15, 1895.

UNITED STATES PATENT OFFICE.

MORRIS F. SMITH, OF PHILADELPHIA, PENNSYLVANIA.

MACHINE-GUN.

SPECIFICATION forming part of Letters Patent No. 548,096, dated October 15, 1895.

Application filed July 6, 1894. Serial No. 516,707. (No model.)

*To all whom it may concern:*

Be it known that I, MORRIS F. SMITH, a citizen of the United States, and a resident of the city of Philadelphia and State of Pennsylvania, have invented certain new and useful Improvements in Machine-Guns, of which the following is a full, clear, and exact description, reference being had to the accompanying drawings, forming part of this specification.

My invention relates to certain improvements in machine-guns, and has for its object to provide a machine-gun of simple and economical construction, in which the working parts are reduced to the smallest possible number and the weight of the machine so reduced that it may be readily manipulated and sighted, even when the largest caliber projectiles are employed.

In the accompanying drawings.

The gun in the present instance is provided with two barrels, which act, preferably, alternately—that is, while a cartridge is being fed to the firing position in one barrel the cartridge in the other barrel is being extracted after having been fired, or while one is firing the other is in position ready to be advanced into the breech of the gun. In the construction described the operating parts for effecting the feeding and firing of the cartridges are duplicated on the opposite sides of the machine, so that but one side will be specifically described.

The general framework comprises the main forging 1, provided with trunnions 2, so that it may be mounted upon a suitable carriage, and projecting centrally from the forward face of the steel forging 1 is a brace-piece 3, forming a support for the rear end of the barrels 4 and 5, there being at the forward end of this brace a cross-bar 6, which embraces the rear portion of the barrels, the thicker reinforcing ends of which are screwed into the face of the forging 1. To the rear end of the forging 1 is bolted a supplemental frame 7, upon which some of the operating parts are supported and guided.

The frame 1 immediately to the rear of each barrel is cut away to form a chamber for the reception of a revolving feed-cylinder 8, mounted at its center upon a bolt 9, screwed into the frame for a sufficient distance to firmly support it. The periphery of this feed-cylinder is provided with a series of longitudinal chambers 10, for the main part in the form of semicircular grooves, one side wall, however, being continued in the arc of a circle, as at 11, to the periphery of the same, while the other side wall 12 extends on a radial line to the periphery, so as to facilitate the discharge of the shells after they have been fired and extracted.

Figure 5:
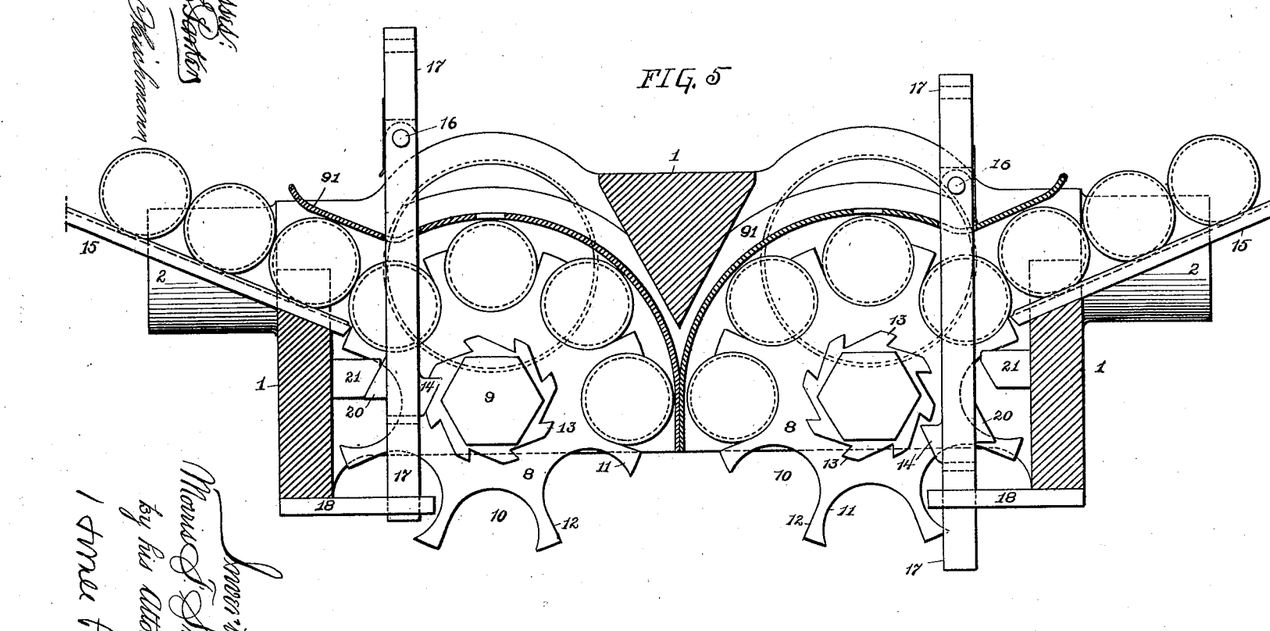
Fig. 5 is a transverse sectional elevation, on an enlarged scale, on the line $aa$, Fig. 4.
Figures 8, 9, 10:
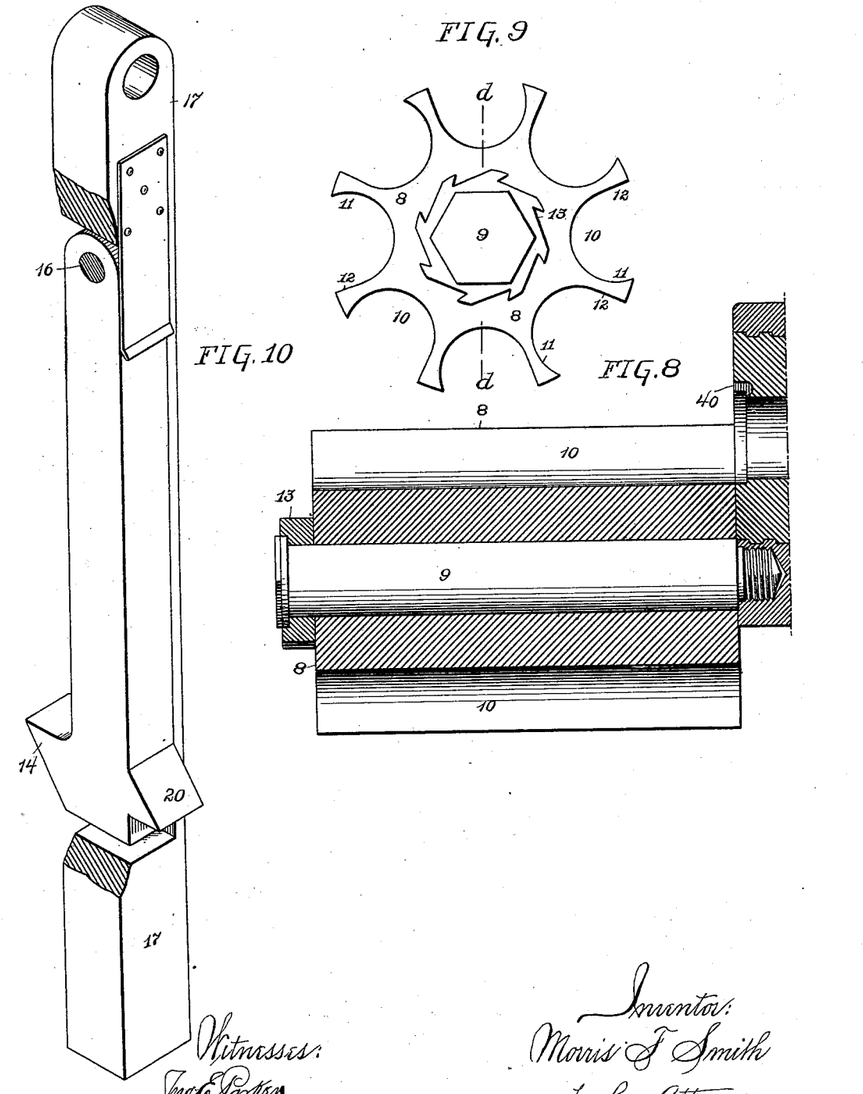
Fig. 8 is a longitudinal sectional elevation on the line $dd$, Fig. 9, showing the revolving shell-feeder on a larger scale.
Fig. 9 is an end elevation of the shell-feeder.
Fig. 10 is a sectional perspective view of one of the actuating-catches for the revolving shell-feeder.

Secured to the rear face of the feed-cylinder is a ratchet-wheel 13, the teeth of which are of the peculiar shape shown more clearly in Figs. 5 and 9, and with these teeth a turning pawl or catch 14 is adapted to engage to turn the cylinder step by step and to present to a point in line with the barrel successive cartridges, which are fed to the chambers of the cylinder by an inclined chute 15. This catch 14 is in the form of a bar and is hung on a pivot 16 in a slotted bar 17, the lower end of which is guided in an opening formed in a plate 18, secured to the lower portion of the frame, while its upper end is pivoted to an operating-lever 19, to which a reciprocating motion is given by a mechanism more fully described hereinafter. At a point directly to the rear of the toothed portion of the turning-catch 14 is an inclined projection 20, which, when the bar 17 is at its highest point, is forced into engagement with a block 21, secured to the frame, and has an inclined face with which the inclined face of the projection 20 comes into contact and forces the catch 14 toward the ratchet-wheel 13, causing the same to bind upon the teeth of the wheel and preventing any further movement of the ratchet-wheel until the next operation of the lever 19. This binding action of the catch and the tooth of the ratchet-wheel with which it is in contact is for the purpose of preventing the movement of the ratchet-wheel and the feed-cylinder to which it is attached for any greater distance than will be necessary to present a cartridge in line with the firing-point of the barrel—that is to say, to the extent of one tooth—and it is necessary to avoid any jumping action in case the turning-catch comes into contact with a tooth of the ratchet-wheel when the machine is being rapidly operated.

The mechanism for operating the lever 19 to effect the raising and lowering of the turning-catch 14 comprises a toothed wheel 23, in one face of which is formed a grooved cam 24, the greater portion of which is concentric with the periphery of the wheel, the cam being so timed as to effect through the medium of the lever 19 a raising and lowering of the turning-catch once during each revolution. The lever 19 is fulcrumed at 25 to a bracket on the frame, and has two arms, one of which arms 19 engages with the upper end of the bar 17, and the other arm 19$^a$ is provided with an antifriction-roller 26, which engages in the cam-groove 24.

The gear-wheel 23 and its fellow on the opposite side of the machine are mounted on a common shaft 27, adapted to bearings in brackets 28, secured to the frame, and at one end of said shaft is mounted a gear-wheel 29, with which a pinion 30, mounted on a stub-shaft, intermeshes. This pinion 30 or its carrying-shaft, if the latter be so mounted as to rotate, is provided with a handle-crank 30$^a$, by which the various working parts of the gun are operated.

The mechanism for feeding the cartridges from the revolving feed-chamber to the breech-opening of the barrel, for firing them, and for extracting the shells, is shown more clearly in Figs. 11 to 14, inclusive. This mechanism comprises a breech-block having a squared shank 31 and a cylindrical body 32, the extreme end of which is adapted to come into contact with the rear face of the cartridge, while it is supported in one of the chambers of the revolving feed-cylinder 8, and to force the same into the breech of the gun-barrel, holding it there during the firing operation, and receiving and taking up all of the recoil, and then, by the aid of an extractor, withdrawing the shell, bringing it once more to the position in the chamber of the feed-cylinder 8 from which it was fed, and remaining inactive until the feed-cylinder has been turned for a sufficient distance to bring forward a fresh cartridge to be operated upon.

Figures 11, 12, 13, 14, 15:
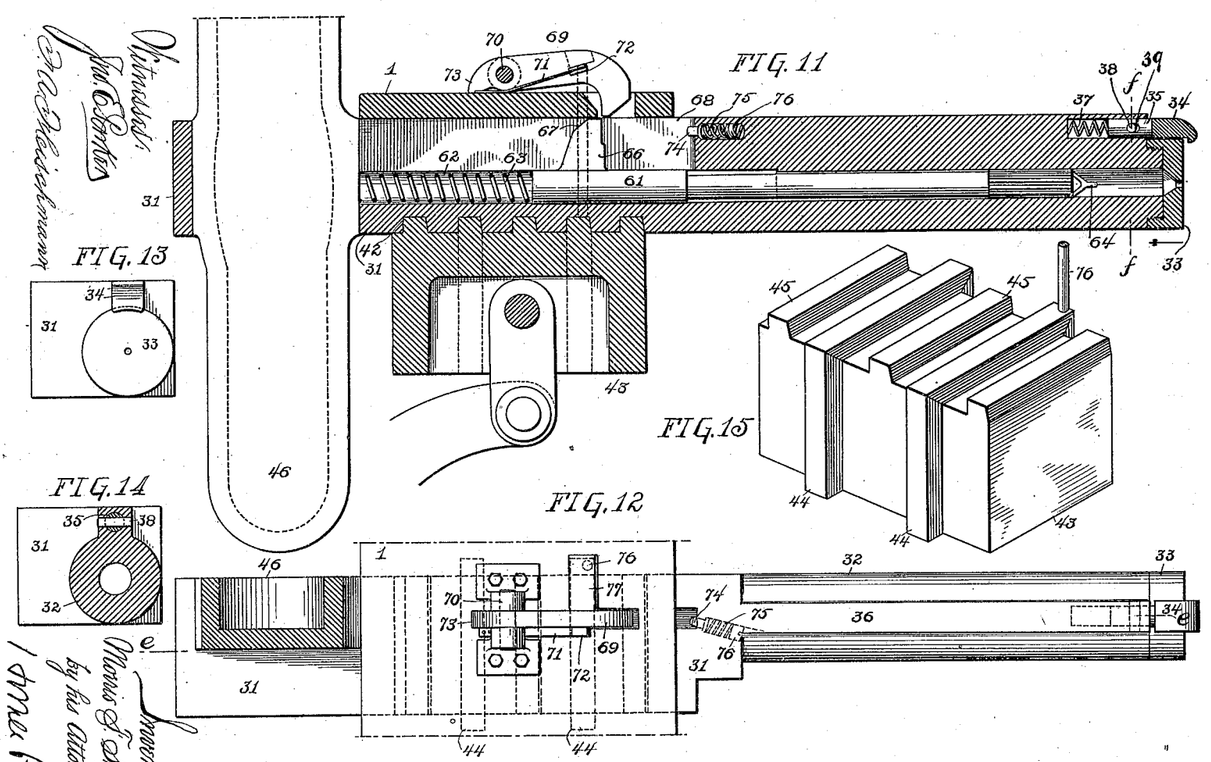
Fig. 11 is a sectional elevation on the line $ee$, Fig. 12, illustrating, on an enlarged scale, the breech-block, the firing-pin, and its operating mechanism.
Fig. 12 is a plan view of the same.
Fig. 13 is an end elevation looking in the direction of the arrow, Fig. 11.
Fig. 14 is a transverse sectional elevation on the line $ff$, Fig. 11.
Fig. 15 is a perspective view of one of the recoil locking-blocks.

At the forward end of the cylindrical portion 32 is screwed a cap or face-plate 33, having a central opening of sufficient size to permit the passage of the firing-pin point, and extending over the cap is an extractor 34, the forward edge of which is curved, as shown in Fig. 11, so as to engage with a considerable portion of the flange on the rear face of the shell to extract the same. The shank 35 of the extractor or catch 34 is cylindrical in form and is adapted to a cylindrical opening in an upper rib 36, forming part of the breech-block, while seated in this opening, between its rear wall and the rear face of the shank of the extractor, is a coiled spring 37, normally tending to force the extractor out to the position shown in Fig. 11, any excessive movement, however, being prevented by a pin 38, extending through the cylindrical rib 36 and passing through a slotted opening 39 in the shank 35, so that there will be sufficient space between the face of the cap 33 and the extractor 34 for the entrance of the flange on the rear face of the cartridge as the latter is carried around in the feed-cylinder 8.

Figure 6:
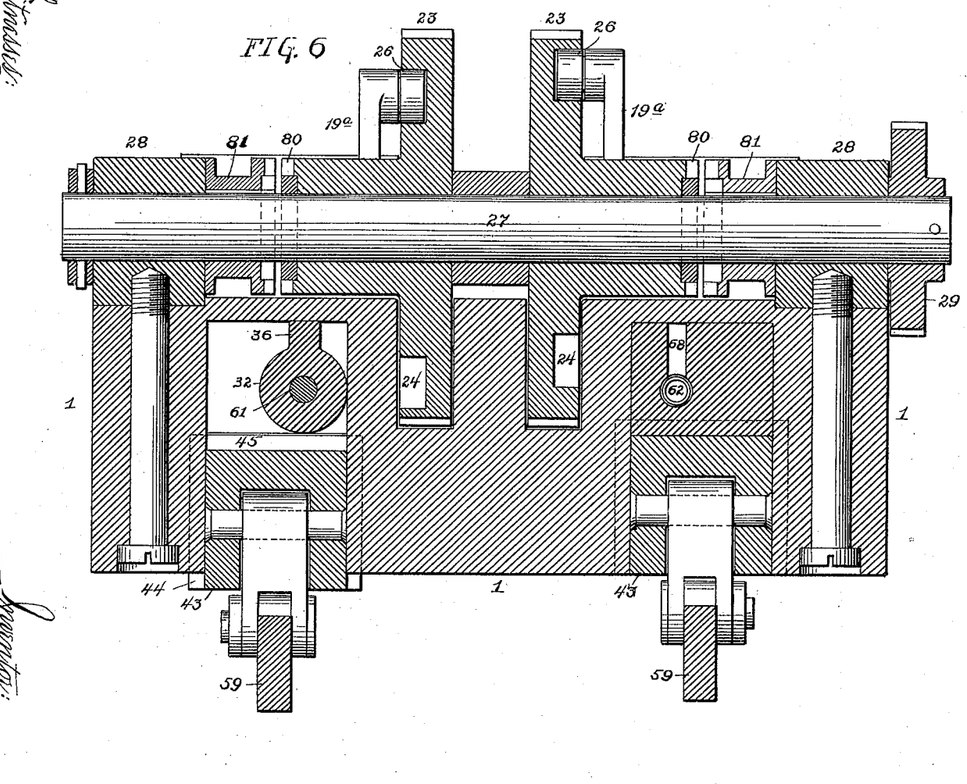
Fig. 6 is a transverse sectional elevation on the line $bb$, Fig. 4.
Figure 7:
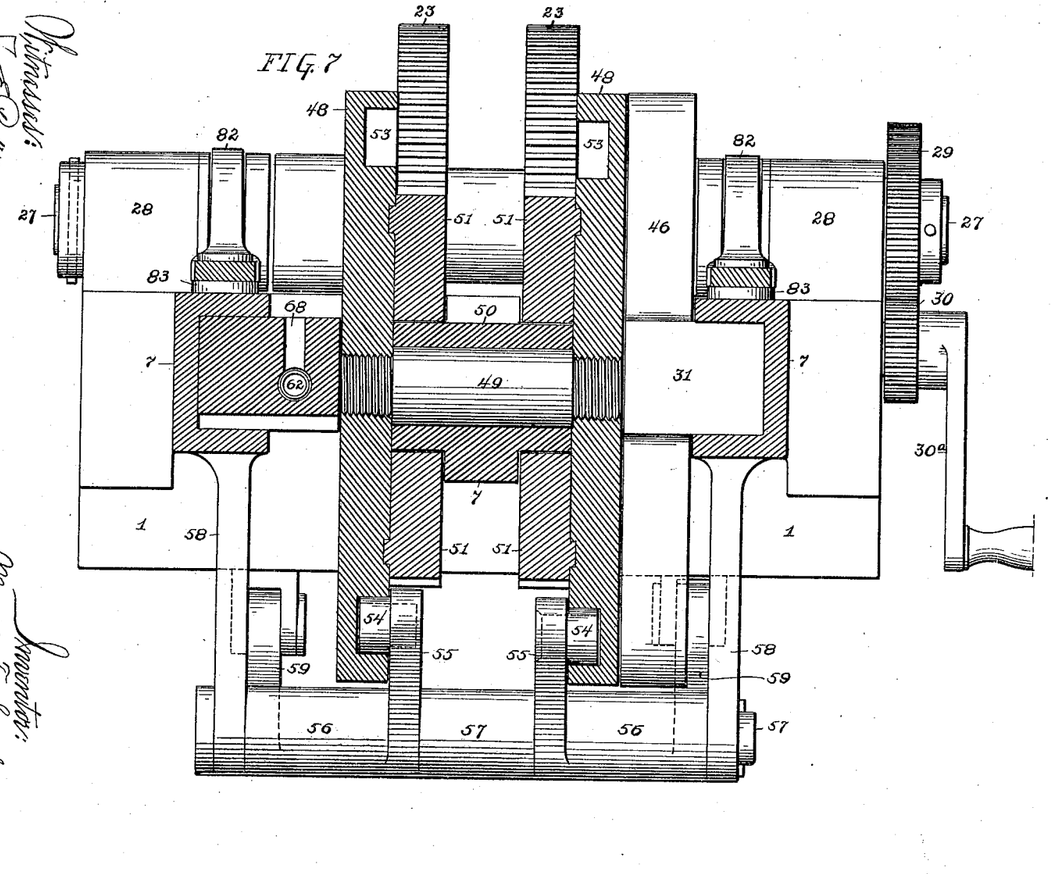
Fig. 7 is a transverse sectional elevation on the line $cc$, Fig. 4.

After a cartridge has been caught and fed forward by the breech-block until it has entered the barrel, the forward curved end of the extractor enters an opening 40, formed in the breech of the barrel, but not extending into the barrel-bore, the recess 40 being of such depth that when the extractor enters it will slightly compress the spring 37 and force the extractor back until it firmly engages with the front of the flange of the cartridge, and the cartridge will then be entirely immediately surrounded and reinforced at sides and flanges and at the back by a practically solid case of metal, and there will be little or no danger of rupturing the shell of the cartridge when firing. The rear portion 31 of the breech-block is guided in a squared opening formed in the steel forging 1, Fig. 6, and on its under side are formed a number of transverse grooves 42, the rear walls of which are in a vertical line, while the front walls incline to a slight extent, as shown more clearly in Fig. 11.

When the breech-block is in a position for firing, the grooved portions 42 of its shank are directly above a block 43, which block 43 is adapted to an opening in the frame and is vertically guided by ribs 44, which enter the vertical grooves provided in the forging, so that the block may travel in a perfectly-vertical line. This block 43, as shown more clearly in Fig. 15, is provided on its upper face with a series of ribs 45, the forward faces of which are inclined and are adapted to come into contact with the inclined walls of the grooves 42, so that after the breech-block has been moved up to the firing position the block 43 may be raised, and on being so raised the ribs 45 enter the grooves 42, and the inclined faces of each coming into contact with the other insure the tightening of the breech-block in its position and the holding of the same during the firing for the purpose of taking up the recoil. The walls of the grooves 42 and of the ribs 45 are preferably beveled, as described, in order to allow of the block 43 being more easily dropped and released from its engaged position with the forging 1 after the firing has taken place.

Figure 1:
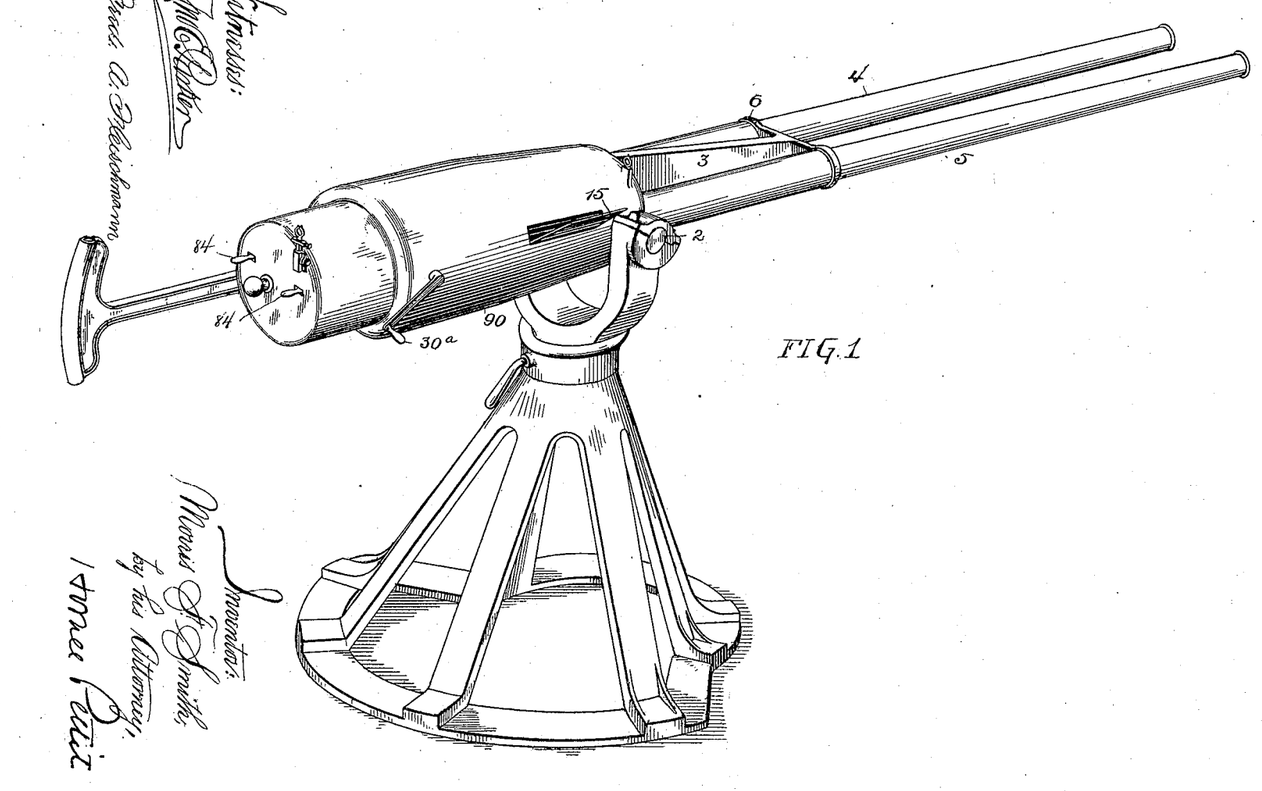
Figure 1 is a perspective view, on a small scale, illustrating a gun made in accordance with my invention and mounted upon a suitable carriage.
Figure 2:
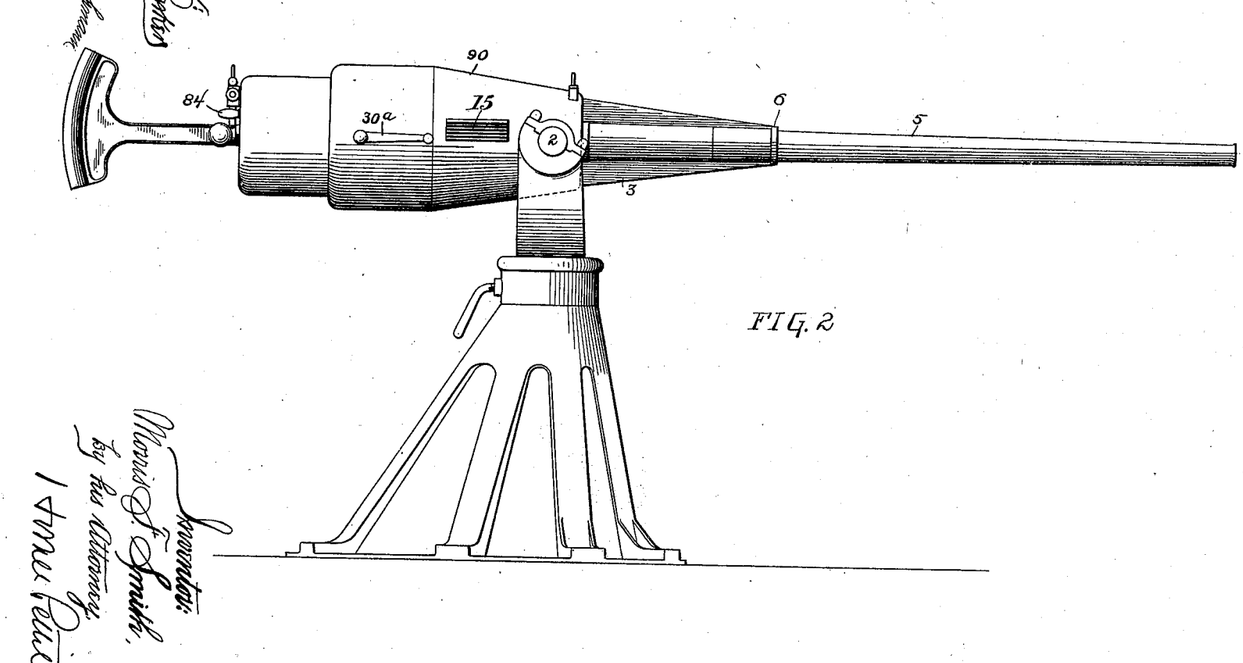
Fig. 2 is a side elevation of the same.
Figure 3:
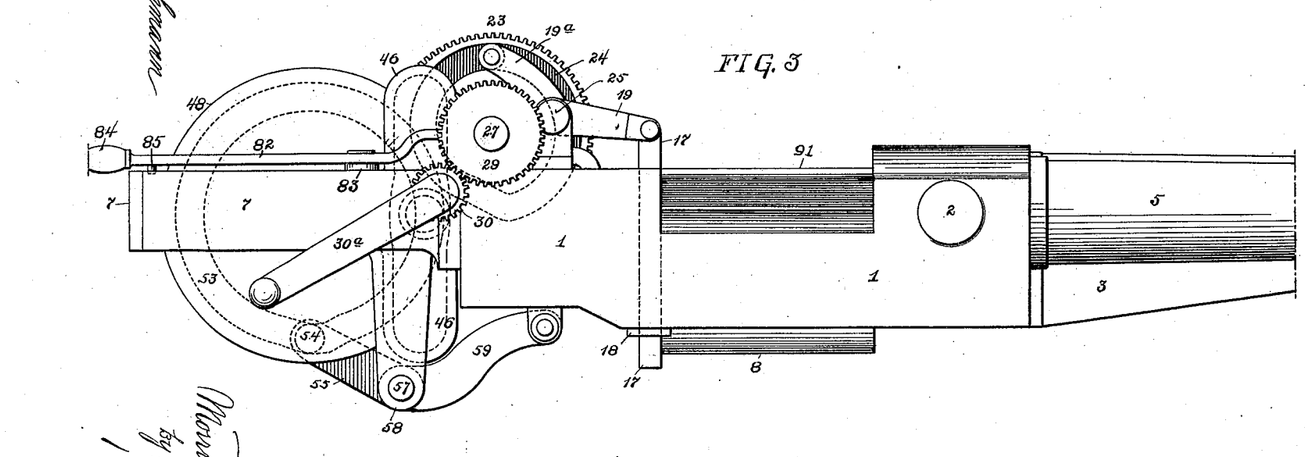
Fig. 3 is a similar elevation of the breech portion of the gun, on a somewhat larger scale.
Figure 4:
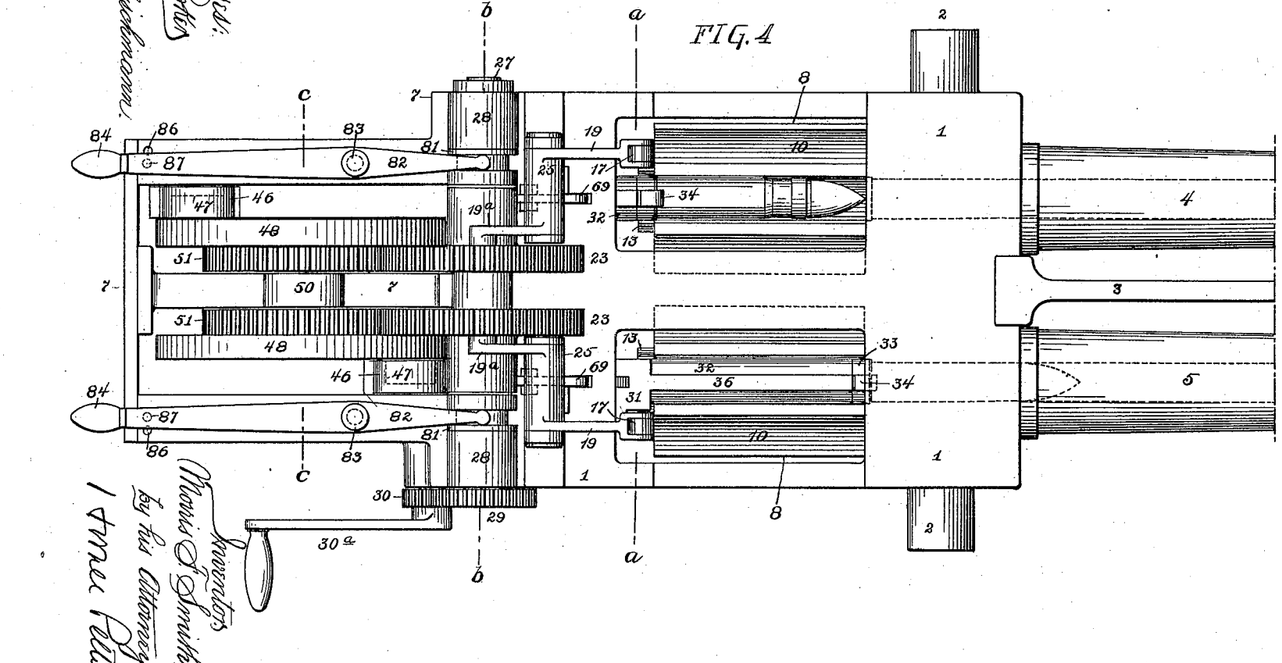
Fig. 4 is a plan view of the breech portion shown in Fig. 3.

At the rear end of the breech-block is secured a yoke 46, which enters a slotted opening in the breech-block directly in the line of the recoil, and engaging in this yoke is an antifriction-roller 47, as shown in Fig. 4, projecting outwardly from a disk 48, which is mounted on a shaft 49, adapted to a bearing 50 in a central bracket of the frame 7. The bearing is at the center of the machine, and the disks 48 of the opposite sides are screwed or otherwise secured on the opposite ends of the shaft. Mounted on the inner face of the disk 48 and indirectly carried by the shaft 49 is a gear-wheel 51, which intermeshes with the gear-wheel 23 and is of the same size and diameter as the latter, so that each will rotate at the same speed, and the disk 48 will therefore rotate once for each revolution of the gear-wheel 23 and its cam-groove 24, so that the pin 47 will effect one complete reciprocation of the yoke 46 and the breech-block during each movement of the cam 24. The cam 24 acts through the lever 19 on the pawl-bar 17 and turns the feed-cylinder 8, so after each partial movement of the feed-cylinder to present a cartridge in a line coincident with the center of the barrel there will be after the cylinder is locked in place a forward movement of the breech-block to force the cartridge from its position in the cylinder to its firing position in the breech of the barrel, and then after a short rest, during which the firing takes place and which continues for a very short time afterward, in order to give time for the cartridge to explode in case it hangs fire, the roller 47 will strike the opposite side of the yoke 46 and will move the same to the farthest rearward position and out of the way of the feed-cylinder, so that the latter may rotate to discharge the empty shell of the exploded cartridge and to present a fresh cartridge in line with the breech-block. At the opposite end of the movement of the yoke—that is, when the breech-block is in its farthest rearward position—there is also a slight dwell to permit the locking of the feed-cylinder in position, and these dwells at the opposite extremes of movement of the breech-block are provided for by arranging the groove or opening of the yoke 46 in the manner more clearly shown in Fig. 11.

It will be noted that on a line extending in a horizontal direction from the center of the shaft 49 the opposite sides of the yoke are in the arc of a circle in which the periphery of the pin 47 travels, so that when the pin strikes these points during its movement it will have no effect on the movement of the yoke, and the yoke will remain in its then position until the pin has traveled to an extent sufficient to cause it to impinge upon the opposite wall of the groove. Further than this the central lines of the upper and lower portions of the grooves are not in the same vertical plane, as clearly shown in said Fig. 11, so that the curved portions of the walls of the groove will be longer on that wall where the roller is leaving than on that wall where the roller impinges after traveling across the groove, so that the roller on striking on such opposite wall will strike a flat surface on which it is free to roll, instead of striking at the junction of the curved and straight portion of the groove, as would occur if the walls of the upper and lower portions of the yoke were in the same vertical plane.

In the disk 48 is a fixed cam-groove 53, in which travels an antifriction-roller 54, carried on one arm 55 of a lever 56, fulcrumed at 57 to a bracket 58 depending from the frame, the opposite arm 59 of the lever being connected by a vertical link to the locking-block 43, the operating portion of the cam-groove being so arranged that immediately after the breech-block assumes the firing position the roller 54 will be positively moved to raise the locking-block 43 into engagement with the grooves 42, provided in the lower portion of the breech-block, and so lock the breech-block in its firing position.

The central portion of the breech-block is recessed for almost its entire length and is adapted to retain the firing-pin 61, the rear portion of which is somewhat enlarged and fitted in an enlarged chamber 62, in which is a coiled compression-spring 63, normally tending to force the firing-pin against the cartridge at the end of the breech-block, this firing-pin terminating in a rather sharp-pointed pin 64, adapted to come into contact with the primer of the cartridge. The rod which forms the firing-pin 61 is preferably provided near its end with a series of longitudinal grooves 65 and the rearward portion of its length is of smaller diameter, so that there will be little or no frictional contact between the periphery of the pin and the walls of the opening or recess in which it is guided. This portion of the firing-pin may also be provided with transverse or annular grooves, if desired.

Projecting in a vertical direction from the portion 61 is a lug 66, the rear face of which is inclined at 67. This lug projects in a slotted opening 68 in the breech-block and extends up to or nearly to the upper surface of the breech-block, where it is adapted to be engaged by a sear 69, fulcrumed at 70 to the fixed frame of the machine and normally depressed so as to engage the lug 66 by a plate-spring 71, one end of which is fastened in a block 72 in the sear, and the other end, passing under the pivot-point of the pawl, is secured to the frame.

Projecting beyond the fulcrum-point of the sear is a stop 73, which, when the sear is in its highest position, comes into contact with the framework and prevents any excessive upward movement of the sear. At the end of the recess 68 is a pin 74, normally held in the position shown in Fig. 11 by a spring 75, resting against a screw 76, the adjustment of the screw regulating the tension of the spring and the force with which it moves the pin 74.

The operation of this portion of the device is as follows: The framework and the sear which it supports being stationary and the breech-block movable the forward motion of the plunger from its rearward position will cause at a given point the engagement of the sear 69 with the lug 66 on the firing-pin 61, and as the forward movement of the breech-block continues the firing-pin is held at a stationary position, and the spring 63 in the chamber 62 is compressed during all the rest of the travel of the breech-block. When the breech-block finally reaches the firing position, with the cartridge forced up into the breech of the gun, the cam 53 on the disk 48 will operate through the lever 56 to raise the block 43 and to lock the breech-block in position, at which time the vertical pin 76 on the locking-block 43 will engage with a lug 77, projecting from the side of the sear, raising the latter and releasing the lug 66, so that the firing-pin 61 is then free to move forward by the force of the compressed spring 63 and to explode the cartridge. This movement of the firing-pin, however, does not take place until the breech-block is firmly locked against the rear of the cartridge by the engagement of the ribs of the locking-block with the inclined faces of the grooves 42 in the bottom of the breech-block, and the cartridge is therefore firmly held in position before the firing-pin can move. The spring 63 acts with sufficient force to throw the firing-pin the required distance, and the pin 64 will penetrate to some little distance into the primer, and in order to withdraw the pin 64 entirely within the recess in the cap-piece 33 and to take up the shock the lug 66 at the end of its travel strikes the pin 74 and forces it in the direction of the cartridge, causing the compression of the spring 75 and the gradual checking of the movement of the firing-pin, the latter, however, being thrown to a sufficient distance to effect the explosion of the cartridge, and by the time it reaches the full limit of its stroke the force of the spring 63 has been exerted to its fullest extent and the lighter spring 75 can then act to advantage to slightly push back the lug 66 and to withdraw the pin 64 from the primer, so that the face of the cap 33 will be perfectly plain, and a fresh cartridge may roll from the chamber of the feed-cylinder 8 to a point between the face of the cap and the rear of the extractor-catch 34. As the breech-block retreats, it carries with it the firing-pin 61, and the inclined face 67 of the lug 66 will engage with the inclined forward face of the sear 69, and raising the latter above the level of the lug 66, the hammer then dropping down in front of the lug in readiness for the next shot, while the pin 76 has retreated as the locking-block 43 was withdrawn to unlock the breech-block before the starting of its rearward movement. The various parts of the machine are duplicated on opposite sides in such manner that when one of the barrels is in operation or a shell being extracted from it the other barrel is receiving a fresh cartridge, and the explosion of one of the cartridges in one of the barrels takes place just at the time that the breech-block on the opposite side of the machine reaches the limit of rearward movement, so that the sides operate alternately and without interfering with each other in any manner.

In order that the operator may fire one shot or more at will or operate one or both barrels, the wheels 23 are mounted loosely on the shaft 27 and the faces of their hubs are provided each with a single clutch-tooth 80, with which is adapted to engage a single clutch-tooth on a grooved clutch-sleeve 81 under the control of a bifurcated lever 82, fulcrumed at 83 to the framework and having operating-handles 84, provided with a locking-pin 85, adapted to engage with one or other of two recesses 86 and 87, provided in the framework, and so arranged that when the pin is in one opening the clutch will be in engagement with the clutching-face of one of the hubs, and when in engagement with the opposite opening the clutch-faces will be out of engagement and one or other side of the machine will be inoperative. Single clutching-teeth are employed, for the reason that it is desirable to have the parts acting alternately, and where a single tooth is employed the parts will always come together at the same place, and both parts of the machine, when thrown into or out of operation, will act alternately.

The working parts of the apparatus may for the greater part be protected by a casing 90, which may extend over the greater portion of the operating parts, or it may, if necessary, extend entirely to the muzzle of the barrels.

The upper portions of the feeding-cylinders 8 are preferably provided with a guard or shield 91, which operates to assist in retaining the cartridges in position in the cylinder until discharged from the same.

Having thus described my invention, what I claim, and desire to secure by Letters Patent, is—

1. In a machine gun, the combination of the barrels, cylinders, 8, situated at the rear of said barrel, said cylinders having a series of longitudinally disposed cartridge receiving chambers, 10, cartridge guides, 15, carried by the frame, a ratchet wheel, 13, carried by each cylinder, pawl, 14, adapted to engage with said ratchet wheel, a stop, 20, on the rear of said pawl, a vertically reciprocating bar, 17, to which said pawl is pivoted, an inclined stop, 21, carried by the frame and adapted to engage with the stop, 20, a breech block, 32, a firing pin, 61, longitudinally guided in said breech block, a coiled compression spring, 63, situated in a chamber, 62, at the rear of the firing pin, a lug, 66, projecting from said firing pin, a sear, 69, pivoted to the frame and adapted to engage with said lug, 66, an extractor, 34, carried by the forward end of the breech block, grooved locking block, 43, adapted to engage with the rear portion of the breech block, mechanism for raising and lowering said locking block, a vertical pin, 76, carried by said locking block and mechanism for actuating said breech block and locking block, substantially as specified.

2. In a machine gun, the combination of the two barrels, a feed cylinder, 8, situated at the rear of each barrel, said cylinder having a series of longitudinally disposed cartridge receiving chambers, 10, provided in the circumference, a guide, 15, for feeding the cartridges laterally into the said chambers, a ratchet wheel, 13, carried by the feed cylinder, a pawl, 14, adapted to engage with said ratchet wheel, a stop, 20, on said pawl, a vertically reciprocating bar, 17, to which said pawl is pivoted, an inclined stop, 21, carried by the frame and adapted to engage with the stop, 20, a breech block, 32, a firing pin, 61, longitudinally guided therein, an extractor provided upon the end of the breech block, a compression spring for actuating the firing pin, a locking block adapted to lock the breech block in its forward position and assist in receiving the recoil, means for releasing and actuating the firing pin when the breech block is in its forward position and subsequently automatically cocking said firing pin and mechanism for operating the breech block and the locking block, substantially as specified.

3. The combination of the barrel, a revoluble feed cylinder mounted on an axis parallel with said barrel, there being in the periphery of the feed cylinder a series of cartridge receiving chambers each having one wall extended on a radial line from the center of the cylinder and the opposite wall being curved on a line concentric, or nearly so, to the periphery of the cartridge casing, substantially as specified.

4. In a machine gun, the combination of the barrel, a revoluble feed cylinder, a ratchet wheel secured thereto, a fixed stop carried by the frame of the gun and a pawl engaging the teeth of said ratchet wheel and adapted to be brought into contact with said fixed stop when at the limit of its movement and so lock the pawl and tooth and prevent further rotation of the cylinder, substantially as specified.

5. In a machine gun, the combination of the barrel, a revoluble feed cylinder for conveying the cartridges from a point of supply to a point coincident with the center of the barrel, a ratchet wheel secured to or formed integral with said cylinder, a reciprocating pawl adapted to engage the teeth of said ratchet wheel, an inclined spur or projection on the rear face of said pawl and a fixed stud or stop also having an inclined face with which the spur is adapted to come into contact and effect the locking or jamming of the pawl and the tooth with which it is in contact and thus retain the cylinder in a given position, substantially as specified.

6. In a machine gun, the combination of the barrel, a revoluble feed cylinder, 8, for conveying the cartridges from a point of supply to a point coincident with the center of the barrel, a ratchet wheel, 13, secured to or formed integral with said cylinder, a vertically reciprocating bar, 17, guides therefor, a pawl, 14, pivoted to said bar, 17, and adapted to engage the teeth of ratchet wheel, an inclined spur or projection, 20, on the rear face of said pawl, and a fixed stud, 21, carried by the frame and having its outer face inclined and adapted to be engaged by said inclined spur or projection, 20, and effect the locking or jamming of the pawl at the limit of its movement, substantially as specified.

7. In a machine gun, the combination of the barrel, a revoluble feed cylinder, 8, situated at the rear of said barrel, a ratchet wheel, 13, on said cylinder, a pawl, 14, adapted to engage with said ratchet wheel, a vertically reciprocating bar, 17, to which said pawl is pivoted, a locking stop, 20, carried by said pawl, an inclined stop, 21, provided on the frame and adapted to be engaged by said stop, 20, the breech block, 32, a firing pin, 61, guided therein, means for actuating said firing pin, an extractor carried by said breech block and means for reciprocating said breech block, substantially as specified.

8. In a machine gun, the combination of the barrel, a revoluble feed cylinder, 8, situated at the rear of said barrel, a ratchet wheel, 13, on said cylinder a pawl, 14, adapted to engage with said ratchet wheel, a grooved bar, 17, in which said pawl is pivoted, a rotated shaft, 27, a gear wheel, 23, thereon having a face cam, 24, a pivoted lever, 19, 19$^a$, having on one end a pin or roller engaging in said cam groove and its opposite arm being connected to the bar, 17, for effecting the vertical reciprocation of said bar, a locking stop, 20, carried by the pawl an inclined stop, 21, provided on the frame and adapted to be engaged by said stop, 20, the breech block, 32, a firing pin, 61, guided therein, means for actuating said firing pin, an extractor carried by said breech block and means for reciprocating said breech block, substantially as specified.

9. In a machine gun, the combination of the reciprocated breech block having in its lower face a series of transverse grooves, a vertically movable clutch block provided on its upper face with a series of transverse ribs having inclined or tapering forward faces and mechanism for raising the block until its ribs are engaged in the grooves of the breech block, substantially as specified.

10. In a machine gun, the combination with a reciprocating breech block for transferring the cartridges into position in the breech of the gun, said breech block having on its under face a series of transversely disposed parallel grooves, 42, a clutch block, 43, having on its upper face a series of ribs equal in number to the number of grooves in the breech block, vertically disposed guiding ribs, 44, on the opposite sides of said clutch block, guideways in the frame of the gun adapted to receive said vertical guiding ribs, an operating lever pivoted to the frame and having one arm connected to the clutch block and its opposite arm in the path of a cam, and a cam for operating upon said arm for effecting the vertical movement of the clutch block, substantially as specified.

11. In a machine gun, the combination with a reciprocating breech block having on its under face a series of grooves, 42, a vertically guided locking block, 43, having ribs, 45, adapted to engage in the grooves, 42, of the breech block, an operating lever having one arm, 59, connected to said clutch block and its opposite arm, 55, being provided with a pin or roller, 54, and a rotated disk, 48, having a grooved cam, 53, in which said pin or roller travels, for effecting the vertical movement of the clutch block, 43, substantially as specified.

12. In a machine gun, the combination of a barrel, a breech block, 32, a firing pin, 61, therein, a coiled compression spring, 63, situated in a recess, 62, at the rear of the firing pin, a lug, 66, provided on the firing pin and having an inclined rear face at 67, a sear, 69, pivoted to the frame and adapted to engage and hold the lug, 66, during the latter portion of the travel of the breech block toward the barrel, the lower forward face of the sear being inclined and adapted to ride over the inclined portion, 67, of the lug, 66, a spring, 71, normally tending to hold the sear in engagement with the lug and means for effecting the disengagement of the sear from the lug when the breech block has assumed the firing position, substantially as specified.

13. In a machine gun, in combination with the barrels, cartridge feeding cylinders, a breech block, 32, a firing pin, 61, longitudinally disposed in said breech block, a spiral spring, 63, provided in a chamber, 62, at the rear of the firing pin, a lug, 66, on said firing pin, a sear, 69, adapted to engage said lug, a ribbed clutching block, 43, adapted to engage in grooves provided in the lower face of the breech block and lock the latter in firing position, a pin, 76, carried by the clutching block and adapted to effect the disengagement of the sear, 69, and lug, 66, and mechanism provided upon the rear portion of the gun for actuating the breech block and clutching block and for rotating the cylinders at given intervals, substantially as specified.

14. In a machine gun, in combination with the barrels, cylinders, 8, having cartridge receiving chambers, 10, longitudinally disposed in the periphery thereof, cartridge guides, 15, on the frame, a ratchet wheel, 13, secured to or formed integral with each cylinder, a pawl, 14, adapted to engage said ratchet wheel, an actuating bar, 17, to which said pawl is pivoted, a stop, 20, on the pawl, a fixed stop, 21, on the frame with which the stop, 20, is adapted to engage, a breech block, 32, a firing pin, 61, longitudinally disposed in said breech block, a spiral spring, 63, provided in a chamber, 62, at the rear of the firing pin, a lug, 66, on said firing pin, a sear, 69, adapted to engage said lug, an extractor, 34, at the end of the breech block, a grooved clutching block, 43, adapted to engage with and lock the breech block, a pin, 76, carried by the clutch block and adapted to effect the disengagement of the sear, 69, and lug, 66, and mechanism provided upon the rear of the frame of the gun for actuating the breech block and clutch block and for rotating the cylinders at given intervals and means for throwing the operating mechanism connected with one or other or both barrels either into or out of gear, substantially as specified.

15. In a machine gun, the combination of reciprocating breech block for transferring the cartridges into the breech of the gun, an elongated yoke provided upon the rear end of the breech block adapted for the reception of a pin provided upon a revolving disk as a means for reciprocating the breech block, the lines of the inner walls of the upper and lower portions of the yoke being in different vertical planes and the lines of the inner walls of the yoke at or near the center being curved slightly outwardly, substantially as specified.

16. The combination in a machine gun having revoluble cartridge feeding cylinders, of reciprocating breech blocks for transferring the individual cartridges from the respective cylinders into the breech of the barrel and retaining them in position during the firing, an extractor, 34, provided at the end of the breech block for engaging the rim of the cartridge, a firing pin, 61, longitudinally guided within said breech block, a coiled spring, 63, provided at the rear of the firing pin for actuating the same, a lug, 66, on said firing pin, a sear, 69, adapted to engage with said lug, means for effecting the engagement and disengagement of said lug and sear, a pin, 74, guided longitudinally in a recess in said breech block and slightly protruding toward the lug, 66, a coiled spring acting upon said pin, 74, for slightly protruding the same and allowing it to recede under pressure, said pin, 74, being adapted to receive the impact of the lug, 66, near the farthest extent of its forward travel and upon the recoil of the spring of said pin to force the lug, 66, and the firing pin to which it is attached slightly back and thus withdraw the end or point of the firing pin entirely within the end of the breech block after it has first protruded beyond it through the impulse of the spring, 63, substantially as specified.

17. In a machine gun, in combination with the barrels, cylinders, 8, having cartridge receiving chambers, 10, longitudinally disposed in the periphery thereof, inclined cartridge guide, 15, a ratchet wheel, 13, secured to or formed integral with each cylinder, 8, a pawl, 14, adapted to engage the teeth of said ratchet-wheel, an actuating bar, 17, to which said pawl is pivoted, an inclined stop, 20, on the rear face of the pawl, a fixed stop, 21, with which the stop, 20, is adapted to engage, a a breech block, 32, a firing pin, 61, longitudinally guided therein, a spiral spring, 63, provided in a chamber, 62, at the rear of the firing pin, a lug, 66, on said firing pin, a sear, 69, adapted to engage with said lug 66, an extractor, 34, provided at the end of said breech block, a grooved locking block, 43, adapted to engage with and lock the breech block, a pin, 76, carried by said locking block and adapted to effect the disengagement of the sear and lug upon the engagement of the clutch block with the breech block, a yoke, 46, at the rear end of the breech block, a disk, 48, a pin, 47, provided on said disk and operating in the yoke, 46, and a rotated shaft carrying said disk, 48, substantially as specified.

18. In a machine gun, in combination with the barrels, cylinders, 8, having cartridge receiving chambers, 10, longitudinally disposed in the periphery thereof, inclined cartridge guides, 15, a ratchet wheel, 13, secured to or formed integral with each cylinder, 8, a pawl, 14, adapted to engage the teeth of said ratchet wheel, an actuating bar, 17, to which said pawl is pivoted, an inclined stop, 20, on the rear face of the pawl, a fixed stop, 21, with which the stop, 20, is adapted to engage, a breech block, 32, a firing pin, 61, longitudinally guided therein, a spiral spring, 63, provided in a chamber, 62, at the rear of the firing pin, a lug, 66, on said firing pin, a sear, 69, adapted to engage with said lug, 66, an extractor, 34, provided at the end of said breech block, a grooved locking block, 43, adapted to engage with and lock the breech block, a pin, 76, carried by said locking block and adapted to effect the disengagement of the sear and lug upon the engagement of the clutch block with the breech block, a yoke, 46, at the rear end of the breech block, a disk, 48, a pin, 47, provided on said disk and operating in the yoke, 46, a rotated shaft, 49, carrying said disk, there being in said disk a cam groove, 53, a pin, 54, traveling in said cam groove, a pivoted lever having arms, 55 and 59, the arm, 55, carrying the pin, 54, and the arm, 59, being connected with the clutch block, 43, for effecting the vertical movement of said clutch block, substantially as specified.

19. In a machine gun the combination of the frame, the barrels, cartridge feeding cylinders, 8, a ratchet wheel, 13, secured to or forming part of said cylinder, a pawl, 14, engaging said ratchet wheel a grooved bar, 17, in which said pawl is pivoted a lever, having two arms, 19, 19$^a$, and pivoted at 25 to the frame the arm, 19, being connected to the bar, 17, and the arm, 19$^a$, carrying a pin or roller, 26, a shaft, 27, gear wheels, 23, loosely mounted thereon and having cam grooves, 24, for the reception of the pins or rollers, 26, clutch blocks, 81, feathered to such shaft, clutch levers adapted to move such clutch blocks into engagement with the hubs of the wheels, 23, a gear wheel, 29, on the end of shaft, 27, a breech block for each barrel a yoke, 46, at the rear end of each breech block a shaft, 49, gear wheels, 51, mounted thereon and intermeshing with the gear wheels, 23, disks, 48, also mounted on shafts, 49, and having cam grooves, 53, pins, 47, on said disks adapted to travel in the yokes, 46, a clutch block adapted to engage each breech block, a lever fulcrumed at 56 and having two arms, 55 and 59, the arm, 59, being connected to the clutch block and the arm, 55 carrying a pin or roller, 54, adapted to travel in the groove, 53, of the disk, 48, a crank shaft, a crank 30$^a$, thereon and a pinion, 30, also mounted on said crank shaft and intermeshing with the gear wheel, 29, of the shaft, 27, substantially as specified.

In witness whereof I have hereunto set my hand this 3d day of July, A. D. 1894.

MORRIS F. SMITH.

Witnesses:
JNO. A. McCARTHY,
HORACE PETTIT.